March 1, 1966    H. FINEBERG    3,237,553
FOOD PROCESSING
Filed May 8, 1962    2 Sheets-Sheet 1
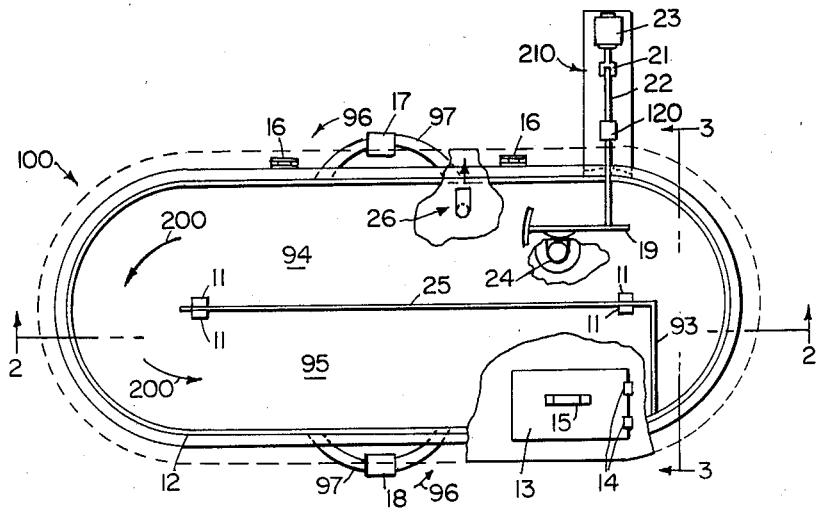
FIG. 1
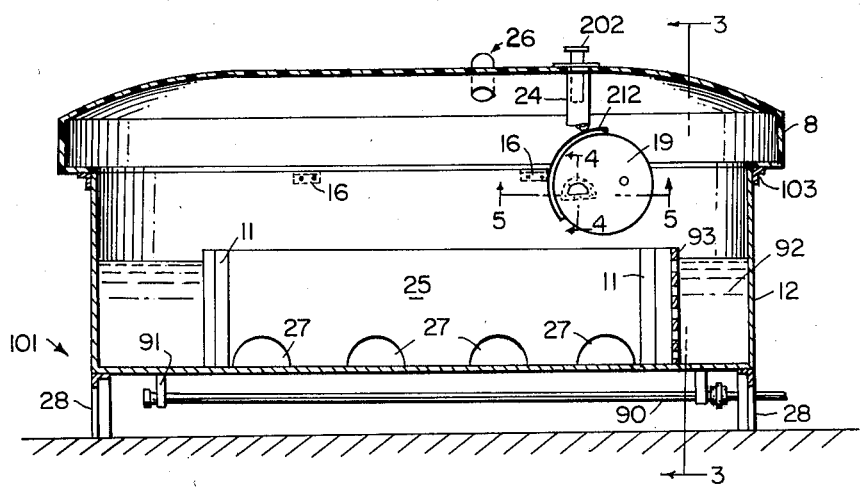
FIG. 2
FIG. 4    FIG. 5
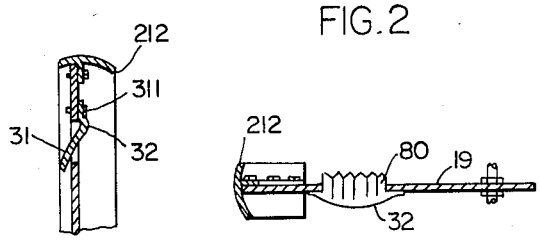
INVENTOR.
HYMAN FINEBERG
BY
ATTORNEYS March 1, 1966 H. FINEBERG 3,237,553
FOOD PROCESSING Filed May 8, 1962 2 Sheets-Sheet 2

INVENTOR.
HYMAN FINEBERG
BY
*Ezekiel Wolf, Wolf & Greenfield*
ATTORNEYS

United States Patent Office 3,237,553
Patented Mar. 1, 1966

1

3,237,553
FOOD PROCESSING
Hyman Fineberg, 520 Farm St., New Bedford, Mass.
Filed May 8, 1962, Ser. No. 193,282
2 Claims. (Cl. 99—341)

The present invention relates in general to food processing, and more particularly concerns a machine for continuously processing food material dropped into a liquid media, such as cooking oil, as the media carries the processed material to a discharge outlet. Some prior art food processing machines particularly adapted for frying food materials are described in U.S. Patent Nos. 1,690,104, 1,688,315 and 1,520,860.

It is an object of the present invention to provide a relatively simply constructed food processing machine for displaying food materials during processing in public areas.

Another object of the invention is to provide means for slicing and frying potato chips rapidly and efficiently with a machine which is relatively compact, simple in construction and easily disassembled for cleaning and sterilization purposes.

Features of a machine according to the invention include a baffle which insures accurate positioning of sliced food materials in the cooking media, and interchangeable slicing blades to facilitate production of varying shaped food materials, such as flat or serrated potato chip slices.

In the preferred form of this invention, there is provided a vessel for holding liquid cooking or frying media in a portion thereof, a heating unit for heating said liquid, and a vertically located slicing plate eccentrically mounted for rotation above a selected portion of the cooking media. A drive mechanism for the slicing plate is located outside of a transparent enclosing cover for the vessel. Fluid pumps provide flow of the liquid cooking media in the vessel and a separator plate having apertures therein is located in the vessel to define cooking channels.

Numerous other features, objects and advantages of the present invention will become apparent from the following specification when read in connection with the accompanying drawings, in which:

FIG. 1 is a top plan view of a preferred embodiment of the present invention;

FIG. 2 is a cross sectional view taken through line 2—2 of FIG. 1;

FIG. 4 is a fragmentary cross sectional view of a slicing plate taken through lines 4—4 of FIG. 2;

FIG. 5 is an alternate embodiment of the slicing plate shown in FIG. 2 taken through lines 5—5 of FIG. 2;

Figure 3:
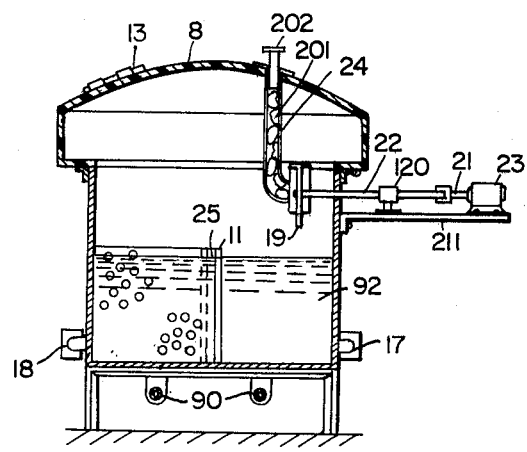
FIG. 3 is a cross sectional view taken through line 3—3 of FIG. 1 and 2.

A preferred embodiment of this invention is designated generally at 100 in FIG. 1. The machine 100 slices potatoes, drops sliced potato chips into a frying media, fries the potato chips and presents the completely fried potato chips for discharge through an access port. A transparent cover 8 protects the processing mechanism while letting the public watch the processing of potato chips in the machine.

A vessel 101 holds liquid cooking media, such as vegetable oil 92. The vessel has an outer upstanding wall 12 integral with a substantially flat base 91. Mounted adjacent and under the base 91 is a series of heating units 90 which extend horizontally below the base of the vessel 101.

Preferably the heating units are thermostatically controlled by thermostats (not shown) located in the vessel 101 and contacting the vegetable oil 92. The thermostats provide a means for temperature control of the vegetable oil and in conjunction with the heaters 90 bring the cooking media to specified temperatures rapidly and then maintain the temperature evenly. Thermostatic control is preferred since adding cold food material, such as potato chips, into the vegetable oil 92 may tend to lower the temperature below desired frying temperatures. The heating units 90 may be gas, electric, or other type heaters.

A separator plate 25 is positioned on the flat bottom 91 and extends longitudinally thereof. The separator plate 25 is mounted by means of upright leg members 11 which are integrally affixed to the base flat plate 91 and provide slots therebetween for slidably receiving and locating the separator plate 25. This arrangement provides for easy and rapid removal of the separator plate 25 for cleaning both the vessel 101 and the separator plate 25. Apertures 27 are provided on the lower edge of the separator plate 25 for purposes as will be described more fully hereinafter.

An apertured plate 93 is provided on one end of the separator plate 25 integral therewith and in effect forms a strainer. The apertures in the plate are sized so as to allow passage of oil and to prevent passage of potato chips therethrough.

Fluid pumps 17 and 18 are mounted on wall 12 of the vessel 101. Each of these pumps remove vegetable oil or other cooking media from channels 94 and 95 of the vessel by means of hoses 97 and pump the removed oil back into the channels by means of outlet hoses 96. The action of the pumps 17 and 18 create two separate fluid flow effects within the vessel 101. The first and most pronounced effect is one tending to move the vegetable oil in the direction of the arrows shown at 200. A second less pronounced effect is fluid flow tending to pass through apertures 27 and interchange oil between channels 94 and 95. This second flow is effective in equalizing temperatures within the vessel 101.

A transparent dome 8 is mounted on an outwardly extending peripheral flange 103 of the vessel 101 by means of conventional hinges 16. In some cases the hinges 16 may be eliminated and the cover 8 may simply rest on the flange 103. Preferably, the cover 8 is dome-shaped and is formed of a clear plastic material, such as acrylic plastic. A flexible ventilation hose 26 is connected to an aperture within the cover 8. Hose 26 allows removal of moisture created during the cooking of potato chips as well as removal of gases within the machine.

A hopper 24 comprising a J-shaped curved substantially vertically extending elongated tube is provided mounted on the cover 8 as best shown in FIG. 3. The hopper 24 is adapted to slidably receive potatoes or other food materials 201 therein. Potatoes 201 are carried by the force of gravity down the tube into engagement with a slicing plate 19, as best shown in FIG. 3. If desired, a weight 202 may be positioned within the hopper 24 and functions to aid in pressing the potatoes against a cutting edge of a blade of the slicing plate 19. It should be understood that the mouth of the hopper is readily accessible from the outside of the machine. In display arrangements this feature is extremely useful in that members of the general public watching the machine may themselves feed potatoes into the machine and watch the processing thereof.

An access port comprising a door 13 is mounted on the cover 8 by means of hinges 14. A handle 15 enables opening of the access port to remove completely processed potato chips as will be described more fully hereinafter.

A slicing unit for the machine of this invention is designated generally at 210 in FIG. 1. Preferably the slicing unit is mounted on a bracket 211 extending outwardly from and rigidly affixed to a side wall 12 of the vessel. The bracket 211 carries a torque producing conventional motor 23 having a rotating shaft 21. The shaft 21 is axially aligned with a rolling bearing 120 which is also mounted on the bracket 211 as best shown in FIG. 3. A substantially circular slicing plate 19 is provided having an eccentrically mounted affixed shaft 22. The shaft 22 is rotatably and removably mounted in bearing 120 and has an end releasably engaging a forked end of the motor shaft 21. The particular construction of the vertical slicing plate removably mounted in bearings 120 and fork shaft 21 is an important feature of the present invention. The slicing plate may be easily removed for cleaning and sterilization purposes by merely opening the cover 8 of the machine, disengaging a pin or other conventional linkage to the forked end and sliding the shaft 22 and plate 19 out of the bearing 120. Furthermore, the specific mounting described above provides a means whereby the slicing plate may be located in the machine and the means for actuating the slicing plate is located outside of an area that normally would tend to have excessive water and cooking oil vapors. Thus, bearings 120 and motor 23 tend to remain substantially unaffected by vapors generated within the vessel of the machine. Moreover, oil and other lubricating agents for the motor and bearing section are displaced from the surface of the cooking media and will not tend to contaminate the cooking media if leakage thereof occurs.

It is a feature of the slicing plate that a slicing blade 31 may be removably positioned therein by means of a conventional attachment such as screw 311. This feature enables interchangeability of slicing blades. A further feature of the slicing blade 31 is the provision of a ridge or lip 32 which extends beyond a plane formed by the slicing plate 19 as clearly shown in FIG. 4. The lip 32 tends to provide a means for breaking the tendency of potato chips cut by the blade 31 to adhere to a flat surface of the slicing blade 19. It should be noted that a corrugated blade 80 of the type shown in FIG. 5 may be employed to cut corrugated potato chips if desired. In the latter case, a ridge 32 is also provided.

A curved baffle 212 is mounted on the plate 19 at an outer peripheral edge thereof. The baffle 212 is located so that potato chips cut by the slicing blade 31 and traveling over the lip 32 are thrown outwardly against 212. The portion 212 baffles the potato chips and directs them into a preselected area of the underlying vegetable oil media 92. The exact positioning of the baffle will vary depending upon the particular speed of rotation of the slicing plate 19 as well as such factors as the positioning of the cutting edge of blade 31. The circular slicing plate is purposely mounted eccentrically of shaft 22 for the purpose of increasing centrifugal force during and following slicing of potato chips. The centrifugal force tends to throw the potato chip against the baffle and subsequently into the preselected area of the cooking media 92.

In use the hopper 24 is loaded with peeled raw potatoes. A weight 202 is placed on the top layer of potatoes. Fluid pumps 17 and 18 are actuated tending to move cooking oil 92 through the channels 94 and 95 in the direction of the arrows shown at 200. Some interchange of fluid occurs through apertures 27 of separator plate 25. Heaters 90 are actuated, thus heating cooking oil 92 to the desired frying temperature. After proper temperature and fluid flow have been achieved, motor 23 is actuated causing rotation of slicing plate 19. Potato chips are sliced from the raw potatoes at each revolution of the slicing plate 19. The chips are directed downwardly to a point directly below the vertically aligned slicing plate 19. The flow caused by fluid pumps 17 and 18 tends to move the chips in the direction of the arrows shown at 200 cooking the potato chips as they travel. Preferably the distance between the point where the chips enter the cooking fluid and the apertured plate 93 is so designed that the potato chips are fully cooked when they reach the apertured plate 93. The plate 93 prevents potato chips from continuing around the path of the fluid flow and collects them below the door 13. The finished potato chips may be removed from the cooking oil by opening of the door 13 and skimming the completed potato chips from the cooking oil by means of a conventional kitchen strainer or the like.

The machine may be operated continuously with a continuous stream of potato chips extending around passageways 94 and 95 to the strainer plate 93. Alternatively, a batch process may be employed wherein slicing of chips is performed until a preselected number of chips are cut and removed from the device before further amounts of potato chips are sliced.

Figure 6:
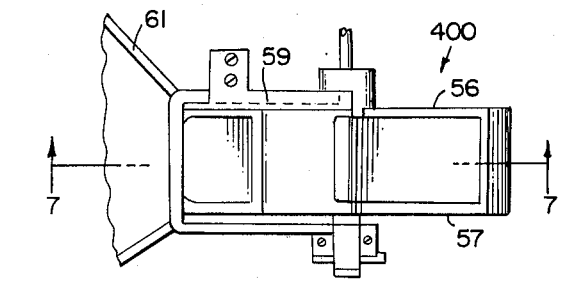
FIG. 6 is a top plan view of a wheel element useful in an alternate embodiment of the present invention.
Figure 7:
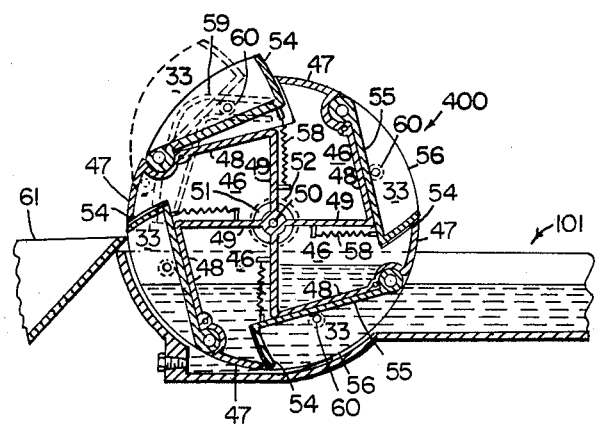
FIG. 7 is a cross sectional view taken through line 7—7 of FIG. 6.

In an alternate embodiment of this invention, the cooking or processing machine may be made fully automatic. A wheel element 400, as shown in FIGS. 6 and 7, may be employed to continuously remove cooked potato chips from the end of the machine in place of the door and the strainer plate arrangement shown in FIG. 1. Varying removal means may be employed, for example, the wheel element 400 is preferably of the type described in U.S. Patent No. 1,688,315. The wheel element 400 is mounted to rotate in a vertical plane and the lower portion is partially submerged in the cooking oil. The wheel 400 is hollow and is divided into four pockets or compartments 46 formed by the peripheral wall portion 47 which joins into the tangential walls 48 and the radial walls 49 which join into the hub portion 50. When the outer portion of these compartments 46 is submerged in the oil, the oil will flow in and then, after the wheel rotates, the oil is trapped in the pocket and directed to the center of the wheel where it flows out to the openings 51 into the hollow hub 52 where the oil pours into an end of channel 94. The vessel 101 is suitably modified by provision of a recessed area beneath the wheel 400 and removal of a section of dome 8 adjacent the wheel 400 as well as removal of plate 93.

Pockets or scoops 33 are hinged in the periphery of the wheel 400 and have perforated edges or ends 54, outwardly sloping surfaces 55 and two side walls 56 and 57. Normally the hinged pockets 33 are held against the wheel by means of springs 58. But when the pocket 33 is at the upper portion of the wheel, it is raised up by means of the cam 59, which is fastened to the vessel at one side of the wheel 400, and which engages with cam rollers 60 which are secured with the side walls 56 of the pockets 33.

The operation of this embodiment of the machine is similar to that described in regard to the preferred embodiment. However, the cooked chips are caught in scoops 33, and oil is directed back again to channel 94. The wheel 400 rotates against the current of the oil so that the edges 54 lift the chips up out from underneath to avoid breaking them up. As may be seen in FIG. 7, one oil pocket 33 is lifting oil out of the channel at about the same time that the opening of a hinged pocket 33 is emerging from the surface of the oil. This aids in moving the oil in the channel towards the wheel when the pockets 33 are opening up. The perforated end of the edge 54 is in position to cover the outer ends of the pockets 46 and prevent any chips from entering the oil pockets 46. The pockets 33 are raised to insure the chips being disengaged from the surface of the edges. The chips, when the pockets are inverted, drop down into the inclined surfaces 55 and are directed away from the edge of the wheel. They fall into a chute 61 and drop down into a box located outside of the machine. A conventional drive motor and axle is employed to actuate the wheel 400.

The specific embodiments of this invention described above are by way of example only. Those skilled in the art may now make numerous variations. For example, other foods such as onions, bananas, etc., may be employed and cooked in a machine of this invention. The specific shape of the elements and configuration of the vessel may be varied. Therefore, while there has been described what are at present considered to be preferred embodiments of this invention, it will be obvious to those skilled in the art that various changes and modifications may be made therein without departing from the spirit and scope of the invention, and it is therefore aimed in the appended claims to cover all such changes and modifications as are inherent in the true spirit and scope of this invention.

What is claimed is:

1. A potato chip frying machine particularly useful for displaying while manufacturing potato chips in merchandising areas frequented and attended by the public, said machine comprising, a vessel having a bottom and two adjoining, longitudinally extending, horizontally positioned channels separated only at intermediate portions thereof by a separator plate extending upwardly from said bottom, said separator plate comprising a substantially solid, planar wall defining a series of openings adjacent a bottom edge thereof enabling interchange of fluid within said channels, said channels adapted to contain a liquid cooking media, a fluid pump operatively engaged with each of said channels for providing both continuous fluid flow of said cooking media around said channels and interchange of fluid through the openings of said separator plate, a removably mounted transparent cover enclosing said vessel, a flexible exhaust hose means operatively engaged with said transparent cover, means interengaging said cover and said vessel whereby said cover may be opened with said exhaust hose distorted but not disengaged from said transparent cover, a slicing unit comprising a slicing plate located in a substantially vertical plane above one of said channels and adapted to continuously slice potato chips, said plate comprising a removable cutting edge located on one side of said plate and positioned adjacent an opening defined by said plate whereby potatoes may be sliced by said plate with the slices formed being directed away from the plane of said plate, said plate being exposed and visible through said transparent cover, a baffle means mounted on a preselected portion of an outer peripheral edge of said slicing plate for directing sliced potatoes downwardly into a preselected area underlying said plate in said one channel, a hopper means for continuously supplying raw, whole potatoes in engaging relationship with said cutting edge, a drive means for said slicing unit removably linked to said plate and located adjacent said vessel, and a means for collecting fried potato chips at a preselected portion of another one of said channels.

2. A potato chip frying machine particularly useful for displaying while manufacturing potato chips in merchandising areas frequented and attended by the public, said machine comprising, a vessel having a bottom and two adjoining, longitudinally extending, horizontally positioned channels separated only at intermediate portions thereof by a separator plate extending upwardly from said bottom, said separator plate comprising a substantially solid, planar wall defining a series of openings adjacent a bottom edge thereof enabling interchange of fluid within said channels, said channels adapted to contain a liquid cooking media, a fluid pump operatively engaged with each of said channels for providing both continuous fluid flow of said cooking media around said channels and interchange of fluid through the openings of said separator plate, a removably mounted transparent cover enclosing said vessel, a slicing unit comprising a slicing plate located in a substantially vertical plane above one of said channels and adapted to continuously slice potato chips, said plate comprising a removable cutting edge located on one side of said plate and positioned adjacent an opening defined by said plate, said removable cutting edge having a base located on one side of said plate and an outwardly extending lip passing through said opening defined by said plate to a second side of said plate, said base being raised from the plane of said plate whereby potato slices cut by said blade are directed against a baffle means, said plate being exposed and visible through said transparent cover, said baffle means mounted on a preselected portion of an outer peripheral edge of said slicing plate for directing sliced potatoes downwardly into a preselected area underlying said plate in said one channel, a hopper means for continuously supplying raw, whole potatoes in engaging relationship with said cutting edge, a drive means for said slicing unit removably linked to said plate and located adjacent said vessel, and a means for collecting fried potato chips at a preselected portion of another one of said channels.

References Cited by the Examiner

UNITED STATES PATENTS

| | | | |
|---|---|---|---|
| 635,450 | 10/1899 | Thompson | 146—114 |
| 1,331,497 | 2/1920 | Hachmann | 146—114 |
| 1,516,962 | 11/1924 | Gunsolley | 99—406 |
| 1,665,017 | 4/1928 | Bergner | 99—406 |
| 1,666,019 | 4/1928 | McCarthy | 99—406 X |
| 1,690,104 | 11/1928 | Denz et al. | 99—406 |
| 1,965,501 | 7/1934 | Knott | 146—78.2 |
| 2,895,405 | 7/1959 | Hopkins | 99—341 |
| 2,947,335 | 8/1960 | Schachet | 146—114 X |

CHARLES A. WILLMUTH, *Primary Examiner.*

NORTON ANSHER, JEROME SCHNALL, ROBERT E. PULFREY, *Examiners.*